US012670292B2

(12) United States Patent
Michael et al.

(10) Patent No.: US 12,670,292 B2
(45) Date of Patent: Jun. 30, 2026

(54) METHOD AND SYSTEM FOR SHARING COLLABORATIVE DIGITAL MODELS

(71) Applicant: RAYTHEON TECHNOLOGIES CORPORATION, Farmington, CT (US)

(72) Inventors: Stalin Arockiadoss Michael, Irving, TX (US); Andrew Klaassen, Manchester, CT (US); James McIntyre, Los Angeles, CA (US)

(73) Assignee: RTX CORPORATION, Farmington, CT (US)

( * ) Notice: Subject to any disclaimer, the term of this patent is extended or adjusted under 35 U.S.C. 154(b) by 508 days.

(21) Appl. No.: 18/143,761

(22) Filed: May 5, 2023

(65) Prior Publication Data

US 2024/0370583 A1     Nov. 7, 2024

(51) Int. Cl.
*G06F 21/62*          (2013.01)
*G06Q 10/10*          (2023.01)

(52) U.S. Cl.
CPC ....... *G06F 21/6245* (2013.01); *G06Q 10/103* (2013.01)

(58) Field of Classification Search
CPC .......................... G06F 21/6245; G06Q 10/103
USPC ......................................................... 726/30
See application file for complete search history.

(56) References Cited

U.S. PATENT DOCUMENTS 10,347,293 B1 *  7/2019  Skinner ................. G06F 3/1462
11,803,661 B1 *  10/2023  Sutherland ............ G06F 40/169

2007/0174207 A1     7/2007  Coulman et al.
2012/0331571 A1 *  12/2012  Vandervort ......... G06F 21/6209
                                                                    726/30
2014/0149298 A1 *  5/2014  Wolf ...................... G06Q 10/10
                                                                    705/311

(Continued)

FOREIGN PATENT DOCUMENTS

CN          109272418          1/2019

OTHER PUBLICATIONS

European Search Report for European Patent Application No. 24173681.8 dated Jun. 12, 2024.

(Continued)

*Primary Examiner* — Kaylee J Huang
(74) *Attorney, Agent, or Firm* — Carlson, Gaskey & Olds, P.C.

(57)          ABSTRACT

An example method of automatically facilitating redaction of a digital model including obtaining at least metadata of a first digital model of a first system and a second digital model of a second system, wherein the first digital model and second digital model each include a plurality of respective discrete subsystems representing different functions of their respective systems, each subsystem including a plurality of respective discrete model elements, and design responsibility for the plurality of discrete subsystems is assigned to a plurality of different engineering teams. The method includes, based on the at least metadata of the first digital model indicating that the first digital model includes a first digital redaction, and further based on the first digital model and second digital model meeting at least one similarity criterion, automatically facilitating a second digital redaction in the second digital model that is based on the first digital redaction.

18 Claims, 9 Drawing Sheets

(56) References Cited

U.S. PATENT DOCUMENTS

| | | |
|---|---|---|
| 2019/0222560 A1 | 7/2019 | Ford et al. |
| 2021/0357550 A1 | 11/2021 | Ognev et al. |

OTHER PUBLICATIONS

European Search Report for European Patent Application No. 24173867.3 dated Jun. 25, 2024.

* cited by examiner

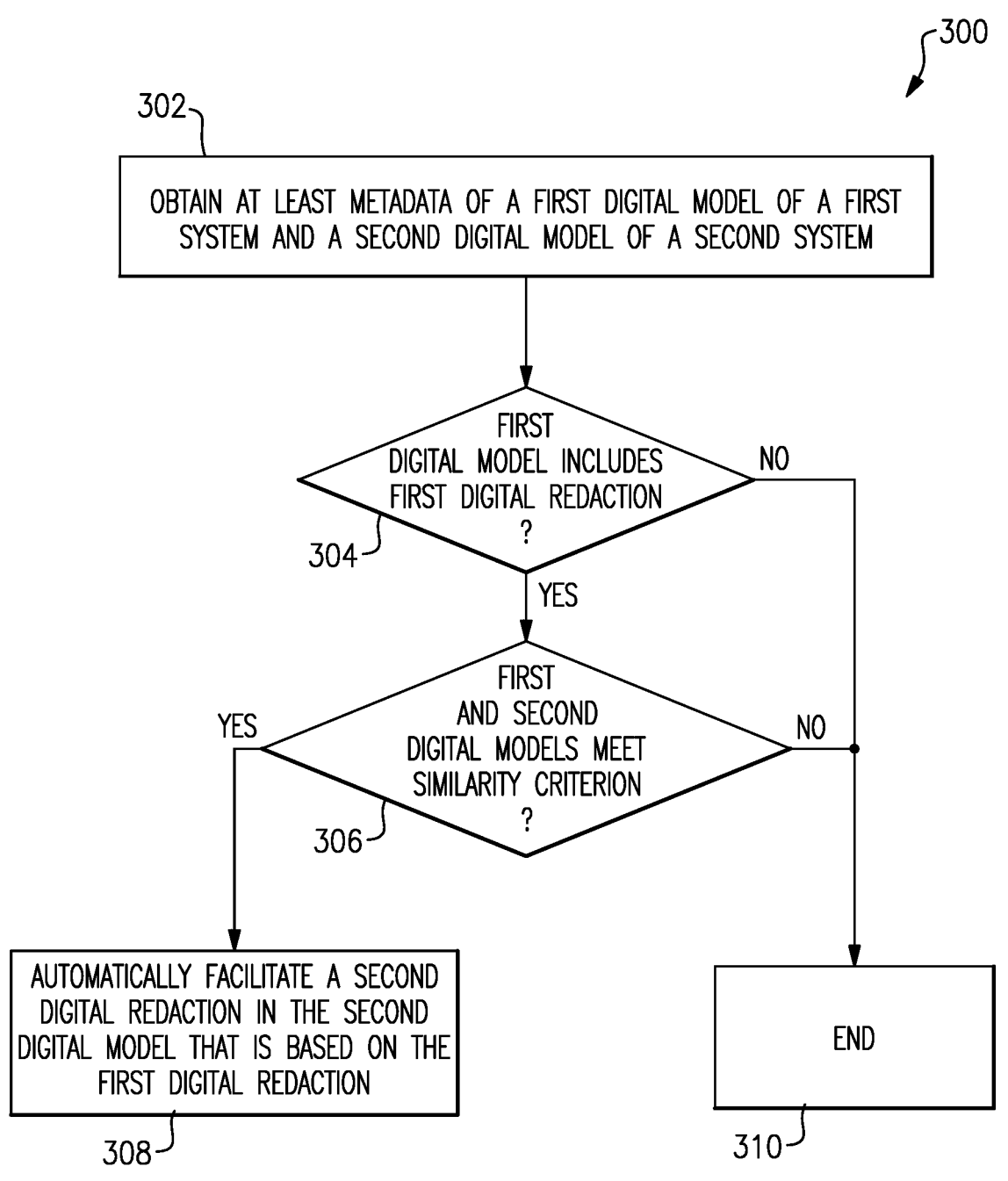

300

302

OBTAIN AT LEAST METADATA OF A FIRST DIGITAL MODEL OF A FIRST SYSTEM AND A SECOND DIGITAL MODEL OF A SECOND SYSTEM

FIRST DIGITAL MODEL INCLUDES FIRST DIGITAL REDACTION ?

304

NO

YES

FIRST AND SECOND DIGITAL MODELS MEET SIMILARITY CRITERION ?

306

YES

NO

AUTOMATICALLY FACILITATE A SECOND DIGITAL REDACTION IN THE SECOND DIGITAL MODEL THAT IS BASED ON THE FIRST DIGITAL REDACTION

308

END

METHOD AND SYSTEM FOR SHARING COLLABORATIVE DIGITAL MODELS

BACKGROUND

This application relates to digital models, and more particularly to sharing elements of digital models in a collaborative design environment.

For complex collaborative design projects that utilize a digital model of a system, it is known to divide design responsibilities for various subsystems representing different functions of the system among different engineering teams. Although contributing engineering teams may be collaborators for the collaborative engineering model, the teams may otherwise be competitors and wish to limit the extent to which other engineering teams are able to access sensitive information in their subsystems.

SUMMARY

An example method of automatically facilitating redaction of a digital model includes obtaining at least metadata of a first digital model of a first system and a second digital model of a second system, wherein the first digital model and second digital model each include a plurality of respective discrete subsystems representing different functions of their respective systems, each subsystem including a plurality of respective discrete model elements, and design responsibility for the plurality of discrete subsystems is assigned to a plurality of different engineering teams. The method includes, based on the at least metadata of the first digital model indicating that the first digital model includes a first digital redaction, and further based on the first digital model and second digital model meeting at least one similarity criterion, automatically facilitating a second digital redaction in the second digital model that is based on the first digital redaction.

In another example of the above described method, the automatically facilitating includes implementing the second digital redaction in the second digital model.

In another example of any of the above described methods, the automatically facilitating includes transmitting, to an administrator of one of the engineering teams having some assigned design responsibility for the second digital model, a recommendation to implement the second digital redaction in the second digital model.

In another example of any of the above described methods, the at least one similarity criterion includes the first digital model and the second digital model sharing a file, the first digital redaction redacts a particular portion of the file, and the second digital redaction is a redaction of the particular portion of the file.

In another example of any of the above described methods, the at least one similarity criterion includes the first digital model and the second digital model each having a respective subsystem that share a plurality of files, the first digital redaction redacts a particular portion of the plurality of files in the first digital model, and the second digital redaction redacts the particular portion of the plurality of files in the second digital model.

Another example of any of the above described methods includes utilizing a neural network to determine whether the first digital model and the second digital model meet the at least one similarity criterion.

In another example of any of the above described methods, the first digital redaction redacts a first model element of the first digital model, design responsibility for the first model element is assigned to a first engineering team of the plurality of engineering teams, the second digital redaction is a redaction applied to a second model element for which design responsibility is assigned to a second engineering team of the plurality of engineering teams, and the automatically facilitating is further based on a history of digital redactions that the first engineering team has applied for the second engineering team outside of the first digital model and the second digital model.

In another example of any of the above described methods, a first user of one of the plurality of engineering teams is initially able to access a first model element of the first digital model or second digital model at a first level of digital redaction, and the method includes determining that the first user has not accessed the first model element for an amount of time that exceeds a predefined inactivity period, and based on the determining, automatically facilitating a second level of digital redaction that is more restrictive than the first level of digital redaction for the first model element for the first user.

In another example of any of the above described methods, a first user of one of the plurality of engineering teams is initially able to access a first model element of the first digital model or second digital model at a first level of digital redaction, and the method includes determining that the first user has accessed the first model element a quantity of times that exceeds a predefined overuse quantity threshold or that the first user has accessed the first model element for a duration of time that exceeds a predefined overuse time threshold, and based on the determining, facilitating a second level of digital redaction that is more restrictive than the first level of digital redaction for the first model element for the first user.

In another example of any of the above described methods, a first user of a first engineering team of the plurality of engineering teams is initially able to access a first model element of the first digital model or the second digital model at a first level of digital redaction, and the method includes determining that the first user has left the first engineering team and joined a second engineering team of the plurality of engineering teams, and based on the determining, facilitating a second level of digital redaction that is more restrictive than the first level of digital redaction for the first model element for the first user.

An example method of automatically facilitating redaction a digital model includes obtaining at least metadata of a digital model of a system, wherein the digital model includes a plurality of respective discrete subsystems representing different functions of the system, each subsystem including a plurality of respective discrete model elements, and design responsibility for the plurality of discrete subsystems is assigned to a plurality of different engineering teams. The method includes determining that a first user is able to access a first model element of the digital model at a first level of digital redaction, and based on the user fulfilling a trigger condition for increased security, automatically facilitating a second level of digital redaction for the first model element for the first user that is more restrictive than the first level of digital redaction, wherein the trigger condition is based on the degree to which the first user has accessed the first model element during a monitoring period.

In another example of the above described method, the trigger condition includes the first user not accessing the first model element during the monitoring period.

In another example of any of the above described methods, the trigger condition includes the first user accessing the first model element a quantity of times that exceeds a predefined access quantity threshold, or the first user accessing the first model element for a duration of time that exceeds a predefined time threshold.

In one example embodiment of a system for redacting a digital model, the system includes a security server that includes processing circuitry operatively connected to memory, the processing circuitry configured to obtain at least metadata of a first digital model of a first system and a second digital model of a second system, wherein the first digital model and second digital model each include a plurality of respective discrete subsystems representing different functions of their respective systems, each subsystem including a plurality of respective discrete model elements, and design responsibility for the plurality of discrete subsystems is assigned to a plurality of different engineering teams. The processing circuitry is configured to, based on the at least metadata of the first digital model indicating that the first digital model includes a first digital redaction, and further based on the first digital model and second digital model meeting at least one similarity criterion, automatically facilitate a second digital redaction in the second digital model that is based on the first digital redaction.

In another example of the above described system, to automatically facilitate the second digital redaction, the processing circuitry is configured to implement the second digital redaction in the second digital model.

In another example of any of the above described systems, to automatically facilitate the second digital redaction, the processing circuitry is configured to transmit, to an administrator of one of the engineering teams having some assigned design responsibility for the second digital model, a recommendation to implement the a second digital redaction in the second digital model.

In another example of any of the above described systems, the at least one similarity criterion includes the first digital model and the second digital model sharing a file, the first digital redaction redacts a particular portion of the file, and the second digital redaction is a redaction of the particular portion of the file.

In another example of any of the above described systems, the at least one similarity criterion includes the first digital model and the second model digital sharing a plurality of files.

In another example of any of the above described systems, the processing circuitry is configured to utilize a neural network to determine whether the first digital model and the second digital model meet the at least one similarity criterion.

In another example of any of the above described systems, the first digital redaction redacts a first model element of the first digital model, design responsibility for the first model element is assigned to a first engineering team of the plurality of engineering teams, the second digital redaction is a redaction of a second model element for which design responsibility is assigned to a second engineering team of the plurality of engineering teams, and the processing circuitry is configured to further base the automatic facilitation of the second digital redaction on a history of digital redactions that the first engineering team has applied for the second engineering team outside of the first digital model and the second digital model.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 8 illustrates an example method of automatically facilitating redaction of a digital model.

DETAILED DESCRIPTION

Figure 1:
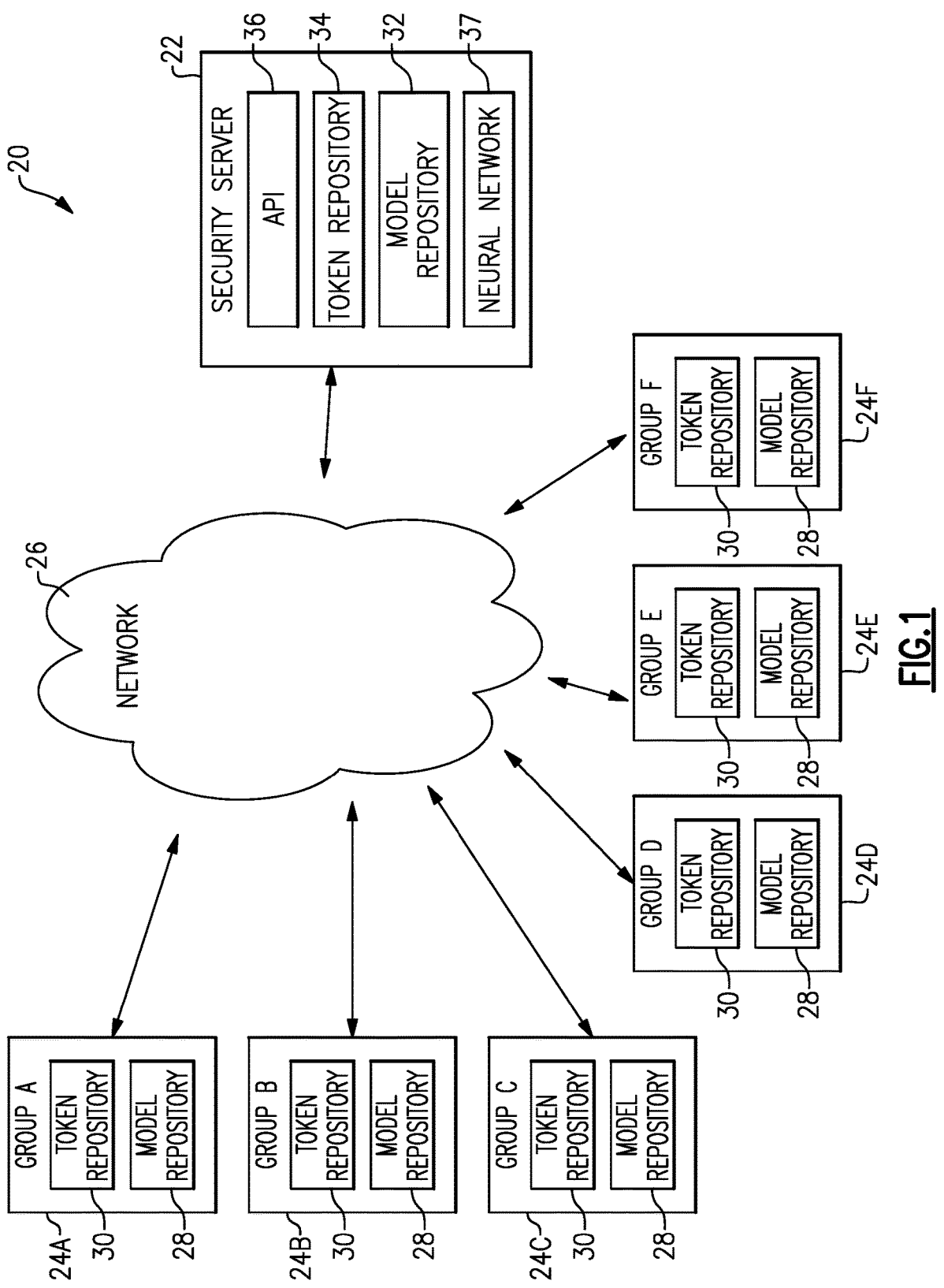
FIG. 1 is a schematic view of an example collaborative design system.

FIG. 1 is a schematic view of an example collaborative design system 20 that includes a security server 22. The security server 22 provides a software platform for facilitating sharing and collaboration for a digital model of a system (e.g., a drone, aircraft, or other system with various functional components). The software platform provided at least in part by the security server 22 facilitates collaboration on a digital model between a plurality of groups 24A-F through one or more networks 26 (e.g., wide area networks, such as the Internet, or one or more local area networks).

Each group 24 has a model repository 28 that that stores model elements of the digital model and each group 24 also has a token repository 30 that may be used to store tokens for accessing redacted versions of model elements of others of the groups 24.

The security server 22 also has its own model repository 32 that stores model elements, and a token repository 34 that stores tokens and/or values derived from tokens (e.g., hashing values derived from tokens). The groups 24 may include engineering teams that design portions of the digital model and also non-designer entities, such as a customer that has commissioned design of the digital model. The security server 22 also provides an application programming interface (API) as part of its software platform, for communicating with the various groups 24A-F to selectively provide access to various model elements of one or more digital models.

The security server 22 may also include or at least have access to a neural network 37, which will be described below in greater detail.

Figure 2:
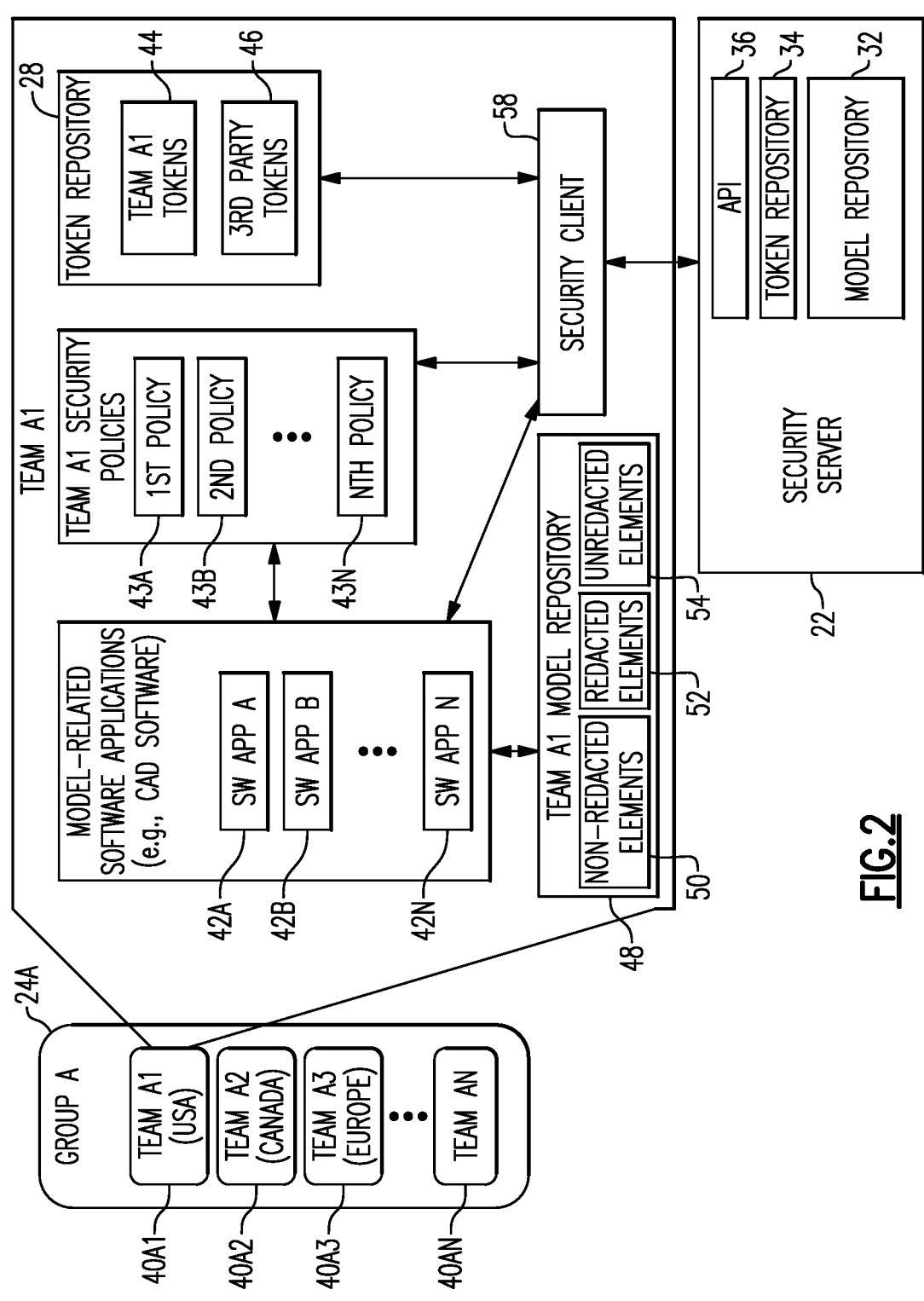
FIG. 2 is a schematic view of example functional elements utilized by an engineering team in the system of FIG. 1.

FIG. 2 is a schematic view of example functional elements utilized by an engineering Team A1 (numeral 40A1) from group 24A of FIG. 1. In the example of FIG. 2, group 24A includes a plurality of Teams 40A-N that are geographically distributed, with team 40A being in the United States, Team B (numeral 40B) being in Canada, and team 40C being in Europe.

As shown in FIG. 2, Team A utilizes a plurality of digital model-related software applications 42A-N, which may include computer aided design (CAD) software, software for preparing circuit schematics, and/or other software (e.g., for providing text-based description of model components, power requirements, dimensions, materials, etc.). As used herein, an Nth item (e.g., element 42N) generally represents a plurality of elements, and not a particular number of elements. Thus, the value of N for element 42N is not necessarily the same as the value of N for other reference numerals (e.g., 43N).

Team A1 has a plurality of security policies 43A-N that provide restrictions on what model elements can be shared outside of the team (e.g., with other teams 40 in group 24A and/or with other groups 24B-F). For example, one of the security policies 43 of Team A1 may restrict the ability of Team A1 to share portions of its digital model contributions outside of the USA (e.g., due to International Traffic in Arms Regulations).

Team A1 has a model repository 48 that includes a plurality of model elements of a digital model, including non-redacted model elements 50, redacted model elements 52, and unredacted model elements 54. As used herein, a "non-redacted" model element is one which has no associated redaction requirement and therefore no associated redacted version. A redacted model element 52 is one that has been at least partially redacted, and an unredacted model element 54 is an unredacted version of a model element that has a redacted counterpart, and that an associated redaction requirement. A redaction to a model element may include a number of things, such as blacking out or hiding text or graphical elements, scrambling data (e.g., strings or numeric values), obscuring details (e.g., by converting a complex geometric shape into a simplified version of the geometric shape, etc.) in order to withhold some detail about the model element that is redacted.

The token repository of Team A1 includes its own tokens 44, used for determining whether those outside of Team A1 can access Team A1's unredacted model elements 54, and third party tokens 46 used for determining whether Team A1 can access unredacted model elements of those outside of Team A1.

A security client 58 is a client of the security server 22 and facilitates communication between Team A1 and the security server 22. The security client 58 utilizes the API 36 of the security server 22 for various tasks, such as, for example, requesting model elements, requesting redaction tokens, receiving requests for unredacted model elements 54, etc.

Figure 3:
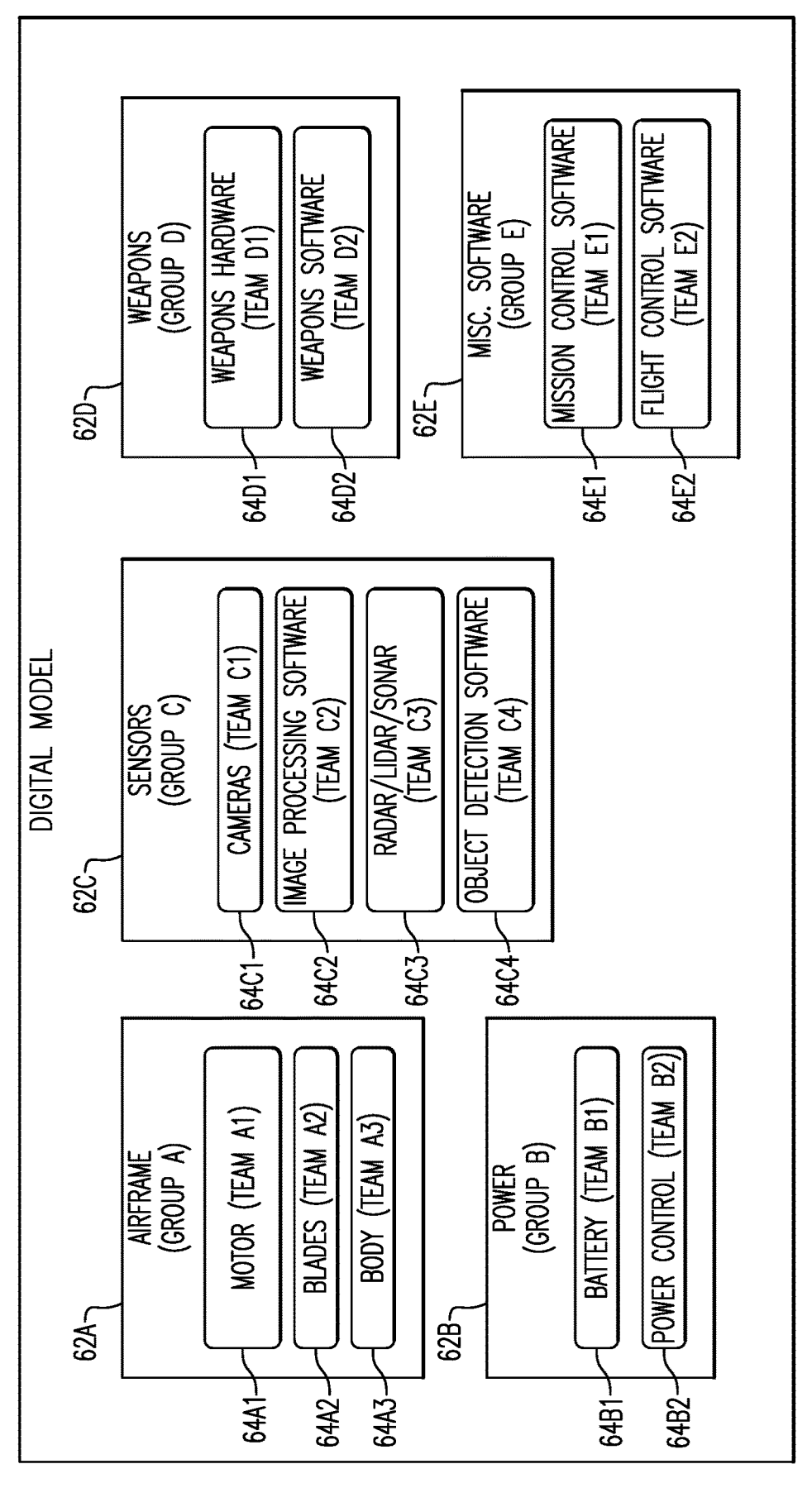
FIG. 3 schematically illustrates an example digital model and its various subsystems.

FIG. 3 schematically illustrates an example digital model 60 for a system, which in the example of FIG. 3 is a drone. The digital model 60 includes a plurality of subsystems 62A-E, which each represent different functions of the drone. Each subsystem 62 includes a plurality of subsidiary base models 64 that are managed by separate teams 40. Subsystem 62A (for which design responsibility is assigned to different teams of Group A) relates to an airframe subsystem of the drone. Subsystem 62B (for which design responsibility is assigned to various teams of Group B) relates to a power system of the drone. Subsystem 62C (for which design responsibility is assigned to various teams of Group C) relates to sensors of the drone. Subsystem 62D (for which design responsibility is assigned to various teams of Group D) relates to weapons of the drone. Subsystem 62E (for which design responsibility is assigned to various teams of Group E) relates to miscellaneous software of the drone.

As shown, Airframe subsystem 62A includes a motor base model 64A1 for which Team A1 is responsible, a blades base model 64A2 for turbine blades of the drone for which Team A2 is responsible, and a body base model 64A3 for a fuselage of the drone for which Team A3 is responsible.

Power subsystem 62B includes a battery base model 64B1 for which Team B1 is responsible, and a power control base model 64B2 for which Team B2 is responsible.

Sensor subsystem 62C includes a cameras base model 64C1 for which Team C1 is responsible, an image processing software base model 64C2 for which Team C2 is responsible, a radar/lidar/sonar base model 64C3 for which Team C3 is responsible, and an object detection software base model 64C4 for which Team C4 is responsible.

Weapons subsystem 62D includes a weapons hardware base model 64D1 for which Team D1 is responsible, and a weapons software base model 64D2 for which Team D2 is responsible.

Miscellaneous software subsystem 62E includes a mission control software base model 64E1 for which Team E1 is responsible, and a flight control software base model 64E2 for which Team E2 is responsible.

Although FIG. 3 is only a non-limiting example, it clearly shows how the design model 60 can have various subsystems 62, each having constituent base models 64 with responsibility distributed across many groups 24 and teams 40.

Figure 4:
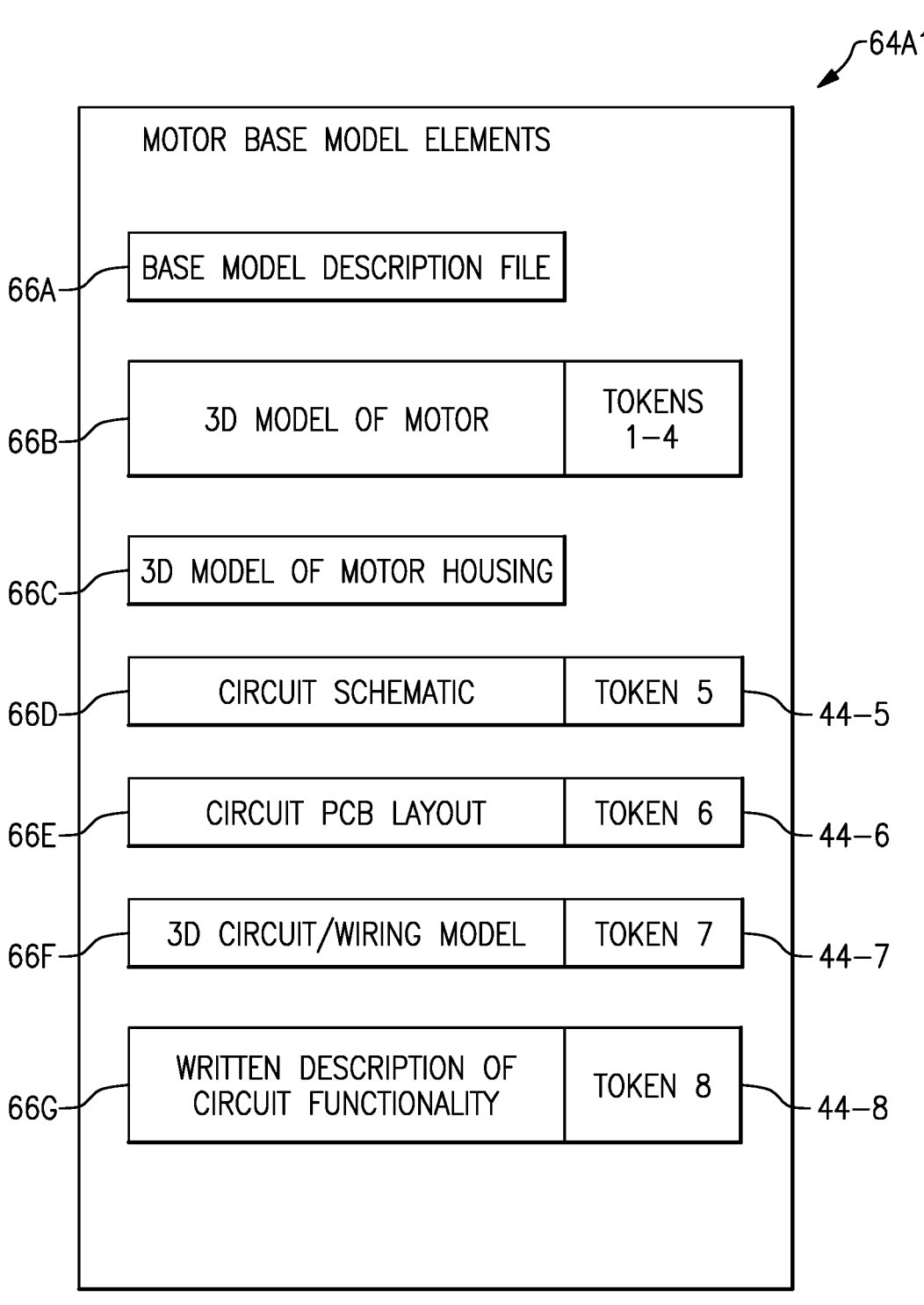
FIG. 4 illustrates an example token allocation for the digital model of FIG. 3.

FIG. 4 illustrates a plurality of example model elements 66A-G of the base model 64A1 and an allocation of redaction tokens 44-1 to 44-8 to various ones of the model elements 66A-G. As shown in FIG. 4, the motor base model 64A1 includes the following model elements: base model description file 66A, 3D model of motor 66B, 3D model of motor housing 66C, circuit schematic 66D, circuit PCB layout 66E, 3D circuit/wiring model 66F, and written description of circuit functionality 66G.

Each of the model elements 66B, 66D, 66E, 66F, and 66G are at least partially redacted and have corresponding tokens 44-1 through 44-8 assigned to those redactions. As discussed above, a redaction to a model element may include a number of things, such as blacking out or hiding text or graphical elements, scrambling data (e.g., strings or numeric values), obscuring details (e.g., by converting a complex geometric shape into a simplified version of the geometric shape, etc.) in order to withhold some detail about the model element that is redacted.

Redaction token 44-5 is associated with a redaction to circuit schematic 66D, redaction token 44-6 is associated with a redaction to circuit PCB layout 66E, redaction token 44-7 is associated with a redaction to 3D circuit/wiring model 66F

Figure 5:
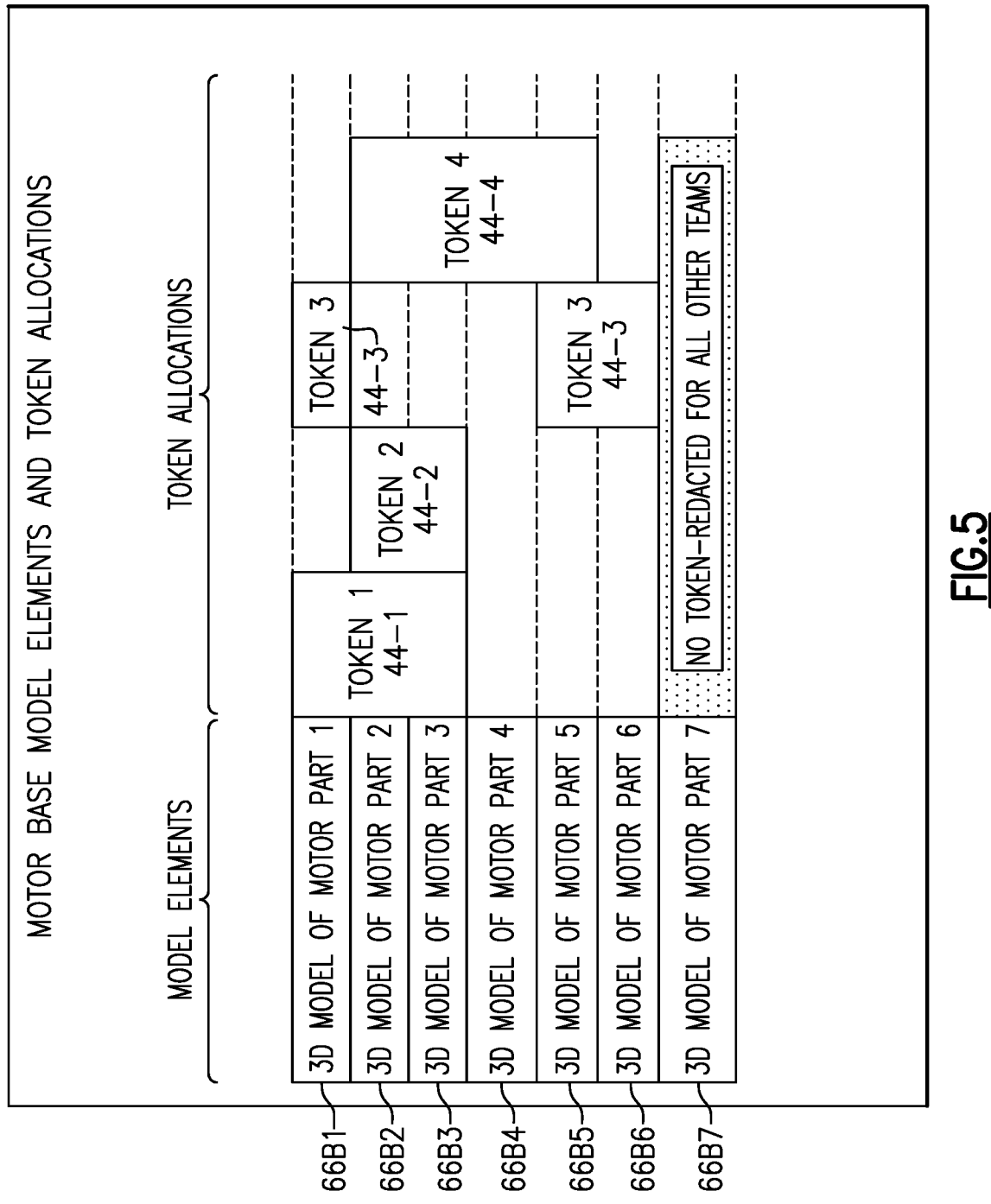
FIG. 5 illustrates another example token allocation for the digital model of FIG. 3.
Figure 6:
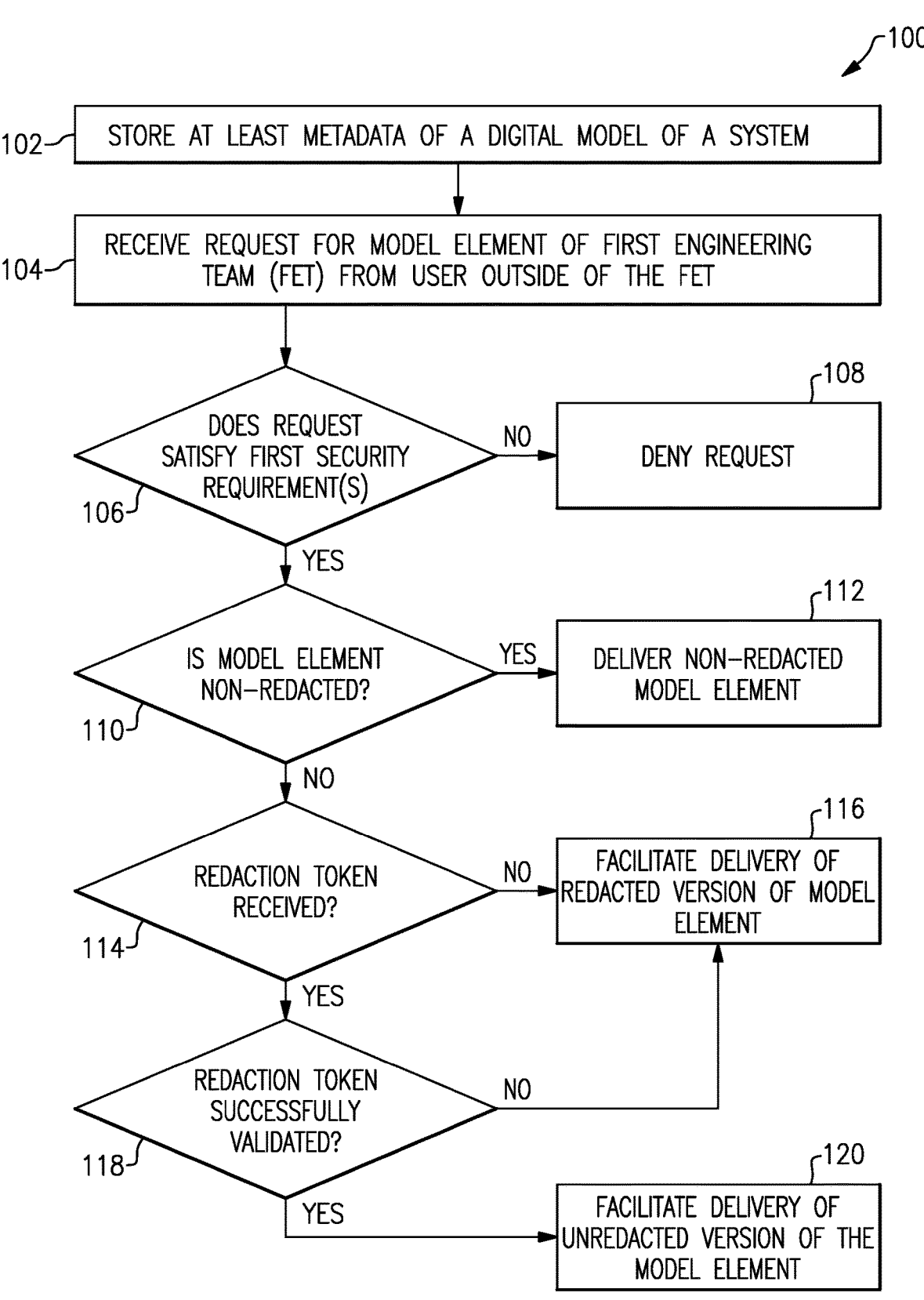
FIG. 6 illustrates an example method of sharing a collaborative design model in the system of FIG. 1.

FIG. 5 illustrates a token allocation for redactions to the 3D motor model 66B, which as shown in FIG. 6 includes a plurality of constituent model elements 66B1-66B7 for different components of the 3D model of the motor 66B. Token 1 (numeral 44-1) is used for redactions to model elements 66B1, 66B2, and 66B3. Token 2 (numeral 44-2) is used for redactions to model elements 66B2 and 66B3. Token 3 (numeral 44-3) is used for redactions to model elements 66B1, 66B5, and 66B6. Token 4 (numeral 44-4) is used for redactions to model elements 66B2 through 66B5. Element 66B7 is redacted, but has no associated redaction token because it is not shareable with anyone outside of Team A1. Different ones of the tokens 44 shown in FIG. 5 can be provided to different groups 24 and/or teams 40 in the system 20 to provide for granular control over what model elements 66 get shared in redacted form, and which groups 24 and/or teams 40 in the system 20 are able to access unredacted versions of the redacted model elements 66. Where a single model element (e.g., model element 66B2)

has multiple associated redaction tokens, those tokens may be associated with the same or with different redactions to the model element 66B2.

FIG. 6 illustrates an example method 100 of sharing a digital model in the system 20 of FIG. 1, which is performed in part or in whole by the security server 22. For the discussion below, assume the "first engineering team" ("FET") is Team A1 (numeral 64A1) (although any of the various engineering teams could be used instead).

At least metadata of a digital model 60 of a system is stored in memory (step 102). The digital model 60 includes a plurality of discrete subsystems 62 representing different functions of the system, each subsystem 62 including a plurality of discrete model elements 66, and design responsibility for different ones of the model elements 66 is assigned to different ones of a plurality of engineering teams 40.

A request for a model element of a first engineering team, which in this example discussion is Team A1, is received from a user outside of Team A1 (step 104). This may be a from another team of Group A (e.g., Team A2 or Team A3), or may be a user from another group 24, for example.

A determination is made of whether the request satisfies one or more first security requirements associated with Team A1 (step 106). In at least one example, the one or more first security requirements of step 106 are baseline security requirements that must be satisfied to have access to any model element 66 of the collaborative digital model 60, which could serve to prevent unauthorized users from accessing even redacted versions of model elements 66. If the one or more first security requirements are not satisfied (a "no" to step 106), the request is denied (step 108). Otherwise, if the one or more first security requirements are satisfied (a "yes" to step 106), a determination is made of whether the requested model element is non-redacted (step 110).

Referring to FIG. 4, the model element 66C is non-redacted because it has no associated redaction requirement, and is authorized for sharing with other teams 40 and groups 24. For such a model element, determination would be a "yes" to step 110, and the method 100 would proceed to delivering the non-redacted model element (step 112).

Otherwise, if the model element 66 is redacted (a "yes" to step 110) (like the other model elements 66A-B and 66D-G), then a determination is made of whether a redaction token has been received that corresponds to the at least one redaction (step 114). If no redaction token is received (a "no" to step 114), then delivery of a redacted version of the requested model element 66 is facilitated (step 116). Step 116 may include delivering the redacted model element 66 from the model repository 32 of the security server 22, for example.

If a redaction token is received that corresponds to the at least one redaction in conjunction with the request (a "yes" to step 114), a token validation algorithm is utilized to determine if the token can be successfully validated (step 118). The token validation algorithm involves comparing the redaction token received with the request of step 104, or a value derived from the received redaction token (e.g., a hashing value derived from the received redaction token), with a master redaction token corresponding to the at least one redaction (e.g., as described in FIGS. 4-5), or a value derived from the master redaction token (e.g., a hashing value derived from the master redaction token), and determining whether the received redaction token is validated based on the comparison.

If the redaction token is not successfully validated (a "no" to step 118), then the method proceeds to step 116, for delivery of the redacted version of the model element. Otherwise, if the redaction token validation is successful (a "yes" to step 118), then delivery of the unredacted version of the model element is facilitated (step 120). Step 120 may include the security server 22 delivering the unredacted version of the model element 66 from its own model repository 32, or may involve the security server 22 transmitting the request and potentially also the validated redaction token to Team A1 for further processing (e.g., for Team A1 to verify if the request satisfies one or more second security requirements).

As discussed above, step 102 includes storing "at least metadata" of the digital model 60 of a system is stored in memory. Some example metadata of the digital model 60 may include names of the subsystems 62, the model elements 64, and/or details of the contents of the model elements 64 (e.g., file names, file sizes, file content, etc. of the model elements 64). Step 102 may include the security server 22 storing model elements in its model repository 32 (e.g., redacted and non-redacted model elements), and relying on each group 24 to store their own unredacted model elements, for example. Alternatively, the security server 22 may omit its own model repository 32 and just obtain model elements on demand from the groups 24 as they are appropriately requested. In this case, the security server 22 would store metadata about the model elements, but not necessarily store the actual model elements themselves. The model repository 32, although shown as being part of the security server 22, may include cloud storage that is external to the security server 22.

Figure 7:
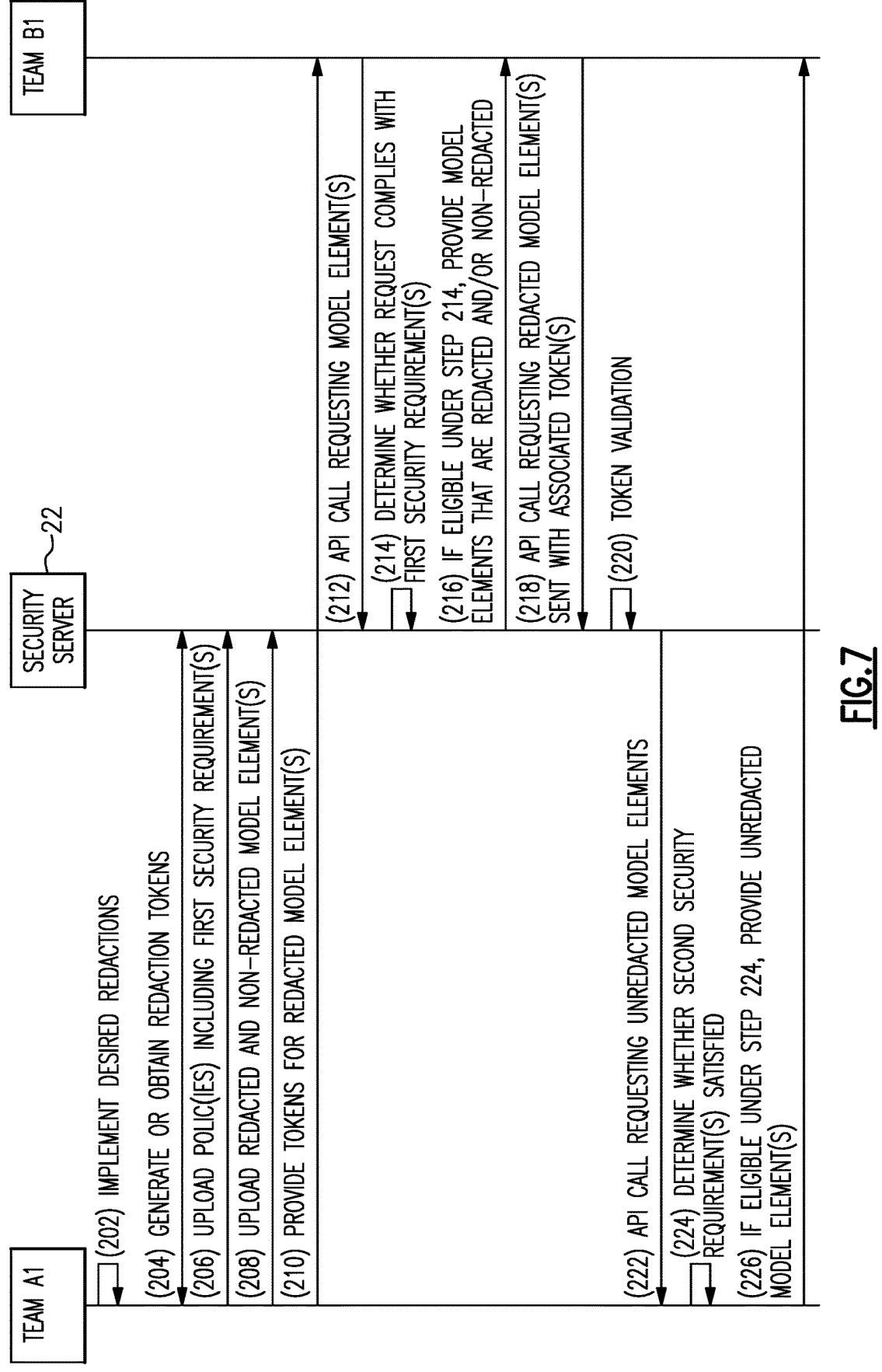
FIG. 7 illustrates an example signaling diagram that may be used to implement aspects of the method of FIG. 6.

FIG. 7 illustrates an example signaling diagram that may be used to implement aspects of the method 100 of FIG. 6, and is illustrated with respect to Team A1 of Group A and Team B1 of Group B. In the example of FIG. 7, assume that Team A1 has a set of one or more first security requirements, and that compliance of a request with the one or more first security requirements is a prerequisite for a user outside of Team A1 to obtain access to any model element 66 of Team A1 (whether a non-redacted model element, redacted model element, or unredacted model element), and is also a prerequisite for the security server 22 to deliver any model element of Team A1 to the user outside of Team A1.

In the example of FIG. 7, further assume that Team A1 also has a set of one or more second security requirements that differ from the one or more first security requirements, and that compliance of a request with the one or more second security requirements is a prerequisite for a user outside of Team A1 to obtain access to an unredacted model element 66 of Team A1, and is also a prerequisite for the security server 22 to deliver any redacted model element 66 of Team A1 to the user outside of Team A1.

Referring still to FIG. 7, Team A1 (e.g., a team member or a representative of Team A1) implements one or more desired redactions (e.g., the various redactions described in FIGS. 4-5) (step 202). Redaction tokens for the one or more redactions are generated or obtained from the security server 22 (step 204). This may include Team A1 generating or obtaining its own redaction tokens and providing them to the security server 22, or the security server 22 generating the tokens on behalf of Team A1 and providing the tokens to Team A1. Thus, in at least one example the security server 22 may receive (e.g., from an administrative user associated with the first engineering team), an indication plurality of discrete digital redactions that correspond to different model elements 66 of a particular subsystem, and associate different redaction tokens with each of the discrete redactions. As used herein, the security server 22 receiving an indication of a redaction may mean the security server 22 receiving a model element that includes a redaction, for example.

Team A1 uploads one or more security policies that include the one or more first security requirements discussed above to the security server 22 (step 206), and uploads its redacted model elements 66 and, if there are any, its non-redacted model elements 66, but not its unredacted model elements 66 (step 208). Team B1 obtains a token for a redaction indicated in step 202 (step 210). This may include Team A1 sending the token to Team B1 on its own or instructing the security server 22 to send the token to Team B1, for example. Team A1's security client 58 may be used for steps 202, 204, 206, 208, and/or 210, for example.

Team B1 (e.g., a team member or representative of Team B1) uses its security client 58 to submit an API call to the API 36 requesting a particular model element (step 212).

The security server 22 determines if the request satisfies the one or more first security requirements of the one or more security policies uploaded in step 206 (step 214, which is an example implementation of step 106 of FIG. 6). If the request satisfies the one or more first security requirements, a model element is transmitted to Team B1 (step 216). If the model element 66 is non-redacted, the non-redacted model element is sent (see step 110 of FIG. 6). Otherwise, if the model element is redacted, the redacted version of the model element is sent (see step 114 of FIG. 6). In at least one example, the security server 22 does not require a redaction token for sending either a non-redacted model element or a redacted model element, but rather only requires a redaction token for sending an unredacted model element.

Team B1 uses its security client 58 to make an API call to API 36 of the security server 22 along with its associated redaction token requesting an unredacted version of the redacted model element sent in step 216 (step 218). The security server 22 utilizes a token validation algorithm to determine whether the received token is successfully validated (step 220, see also step 118 of FIG. 6).

If the redaction token is successfully validated, the security server 22 sends a request to the security client 58 of Team A1 for the unredacted model element (step 222). Team A1 (e.g., its security client 58) determines whether the request received in step 218 satisfies the one or more second security requirements of Team A1 discussed above (step 224), and if satisfied, Team A1 provides the unredacted model element(s) to Team B1, optionally through the security server 22 (step 226).

The security policies (referred to as "security requirements" above) may include a wide variety of policies, such of which may be characterized as "static" because they can be applied by the security server 22 on its own, and others which may be characterized as "dynamic" since they are more suitable to implementation by the various groups 24 participating in the system.

For example, the security requirements may be used to block any access to an entire base model 64 or one or more its model elements 66, or prevent only unredacted access to the base model 64 or one or more of its model elements 66.

Here are some example security requirements that may be used in the system 10:

Geography-based requirement limiting access based on geography (e.g., even between teams 40 of a single group 24), such as for imposing export controls (e.g., to comply with International Traffic in Arms Regulations "ITAR" regulations).

Role-based requirements that impose limitations based on role (e.g., permit manager of a given team 40 more access than a non-manager of the team 40).

Program-based requirements that impose redaction limitations based on a state of the collaborative model within a design life cycle.

Internet Protocol (IP) address requirements that either blacklist certain IP addresses, or blacklist all IP addresses not part of a whitelist from receiving unredacted model elements, or any model elements at all.

Intellectual property requirements that prohibit sharing an unredacted version of a model element until some IP protection step has been taken (e.g., trade secret agreement entered, non-disclosure agreement entered, patent application filed, etc.).

Device requirements that prohibit certain types of access (e.g., access to redacted or unredacted model elements) based on a device identifier.

License requirements that only facilitate a predefined number of uses or accesses to a particular model element (as excessive access and/or use may be indicative of abnormal activity).

Thus, in determining whether a particular request satisfies the criteria above, the security server 22 may also analyze related information about the requestor (e.g., their IP address, their device identifier, their role in the system 20, etc.)

These example security requirements, or others, may be used as part of either the one or more first security requirements applied by the security server 22 (e.g., in step 106/ 214) and/or the one or more second security requirements applied by the engineering team sharing its model. For some requirements, where the security server 22 is less likely to have insight into whether the requirement is fulfilled (e.g., whether a patent application has been filed yet), it may be more advantageous to include such requirements in the list of one or more second security requirements.

In at least one example, redactions are made according to a hierarchy, and corresponding redaction tokens also have a hierarchical ranking (e.g., at least a level one redaction token required to access certain model elements with a level one redaction, at least a level redaction token required to access certain model elements with a level two redaction, etc.).

In at least one example, a single redaction token may be associated with multiple redactions at different levels. Using the example of FIG. 5, in one example redaction token 1 (numeral 44-1) is a level one redaction token for accessing an unredacted version of a level one redaction, and redaction token 2 (reference numeral 44-2) is a level two redaction token for accessing the an unredacted version of the level one redaction and also of a level two redaction.

The features described above provide for engineering teams participating in a collaborative design project with a collaborative engineering model to have granular control over who can access their model elements.

FIG. 8 illustrates an example method 300 of automatically facilitating redaction of a digital model. The method 300 may be performed by the security server 22, for example. At least metadata of a first digital model 60 of a first system (e.g., a first drone system) and a second digital model 60 of a second system (e.g., a second drone system) is obtained (step 302). The first digital model 60 and second digital model 60 each include a plurality of respective discrete subsystems 62 representing different functions of their respective systems. Each subsystem 62 includes a plurality of respective discrete model elements 64, and design responsibility for the plurality of discrete subsystems 62 is assigned to a plurality of different engineering teams (e.g., as shown in FIG. 3).

Like the "storing at least metadata" discussed above in step 102, "obtaining at least metadata" may include obtaining an entire digital model 60, entire subsystems 62 of the digital model 60, and/or obtaining model elements 62 of the model 62, or may include obtaining just metadata for some or all of these items (e.g., describing file names, file sizes, file content, etc. of model elements).

A determination is made of whether the first digital model 60 includes a first digital redaction (step 304). If the first digital redaction is included (a "yes" to step 304), a determination is made of whether the first and second models meet at least one similarity criterion (step 306). If the similarity criterion is met (a "yes" to step 306), then a second digital redaction in the second digital model that is based on the first digital redaction is automatically facilitated (step 308).

The "facilitating" of step 308 may include the security server 22 implementing the second digital redaction in the second digital model 60, or transmitting, to an administrator of one of the engineering team having some assigned design responsibility for the second digital model, a recommendation to implement the second digital redaction in the second digital model, for example.

If the first model does not include a first digital redaction (a "no" to step 304), or the first and second models do not meet the similarity criterion (a "no" to step 306), the method 300 ends (step 310).

The similarity criterion of step 306 could cover a variety of scenarios, and may be based on model similarity, redaction similarity, and/or similarity in who redactions are applied to. In one example, the at least one similarity criterion includes the first digital model and the second digital model sharing a file (e.g., a file corresponding a particular model element 66) and/or sharing a plurality of files (e.g., a group of model elements 66 or an entire subsystem 62), the first digital redaction redacts a particular portion of the file(s), and the second digital redaction is a redaction of the same particular portion(s) of the file(s).

Some example file similarities that may satisfy the at least one similarity criterion may include one or more of the following:

The model element corresponding to the shared file in a particular subsystem 62 is present in first and second digital models 60.

The model element corresponding to the shared file in the first digital model is different from the model element corresponding to the shared file in the second digital model (e.g., there is some overlap due to the shared file, but also some difference, perhaps due to fewer or additional files being present in the model element).

The shared file(s) may not be 100% identical, but may share a certain percentage of similarity (e.g., 70%) to satisfy the at least one similarity criterion. If the second model element is a modified and/or updated version of the first model element, but they are still sufficiently similar, that similarity may be enough for the security server 22 to determine that the first and second digital models meet the at least one similarity criterion in step 306, for example.

The first redaction analyzed in step 304 and the second redaction facilitated in step 308 may be for the same user, or for different users. Thus, the at least one similarity criterion may also include a user criterion. In a same user example of a user criterion, the first user for which the first digital redaction analyzed in step 304 is also on an engineering team associated with the second digital model 60, and the second digital redaction is applied In a different user example of a user criterion, the first redaction is for all users from a first company (e.g., users A, B, and C from Company A, regardless of which subsystem they have responsibility for), and the second redaction is applied to different users from the same company based on those users being part of the same company (e.g., users D, E, and F from Company A) even though they are different users.

In another different user example of a user criterion, the first redaction is for weapons teams (e.g., team D1 and D2 of FIG. 3) responsible for design of a weapons subsystem 62D, and the second redaction is for a different weapons team that is responsible for a different weapons subsystem in the second model. In such an example, the user(s) to which the second redaction is applied are similar to the users of the first model in that they are responsible for the same type of subsystem (e.g., weapons), even if the subsystems are not identical.

In one example, at least one similarity criterion of step 306 includes a first similarity criterion which relates to model element similarity (e.g., is a same file present in model elements in the first and second digital model), and also includes a user similarity criterion (e.g., is the user and/or engineering team to which the redaction is applied in the first digital model part also involved in the second digital model). In one example, both of these criteria must be satisfied in order to perform step 308.

In one example, the security server 22 utilizes the neural network 37 (shown in FIG. 1) to determine whether the first digital model and the second digital model meet the at least one similarity criterion. The neural network 37 is trained with historical data relating to redactions utilized for other digital models, and may be used to draw inferences about what model elements 66 are usually redacted, what types of redactions are generally used for such model elements 66, and/or what users are typically subjected to redaction for such model elements 66. For example, the security server 22 may use the neural network 37 to learn that certain model elements of the weapons subsystem 62D should be redacted by default and/or that the mission control software base model 64 should be redacted by default. For example, if the weapons subsystem 62D is redacted in each digital model in which it appears for 85% of users, then the neural network 37 may be used to infer that the weapons subsystem 62D should also be redacted in step 308. The neural network 37 may be trained with metadata about digital models (e.g., descriptions of subsystem and their content and associated redactions) and/or may be trained with the models themselves (e.g., analyzing contents of various model elements beyond their metadata description(s)).

As discussed above, the similarity criterion of step 306 may be based on redaction similarity. In one such example, the first digital redaction redacts for a first model element 66 of the first digital model 60, design responsibility for the first model element 66 is assigned to a first engineering team of the plurality of engineering teams (e.g., Team A1), the first digital redaction is applied to a second engineering team of the plurality of engineering teams (e.g., Team B1), and the automatic facilitating of step 308 is further based on a history of digital redactions that the first engineering team has applied for the second engineering team outside of the first digital model and the second digital model (e.g., for other digital models). As a particular example, if Team A1 historically redacts its circuit schematics (e.g., that of model element 66E of FIG. 4) in a particular way and/or for a particular group of users (e.g., all users except for the engineering team responsible for the power subsystem 62B), then step 406 may include redacting the circuit schematic model element 66D for all teams outside of Group A and Group B, regardless of how similar or dissimilar the circuit schematics themselves are. In such examples, the at least one similarity criterion may be based on model element category (e.g., circuit schematic) and not content of the model element (e.g., particulars of the circuit schematic), or may be based on a combination of the two (e.g., redact all circuit schematics that include certain elements or circuit portions).

Figure 9:
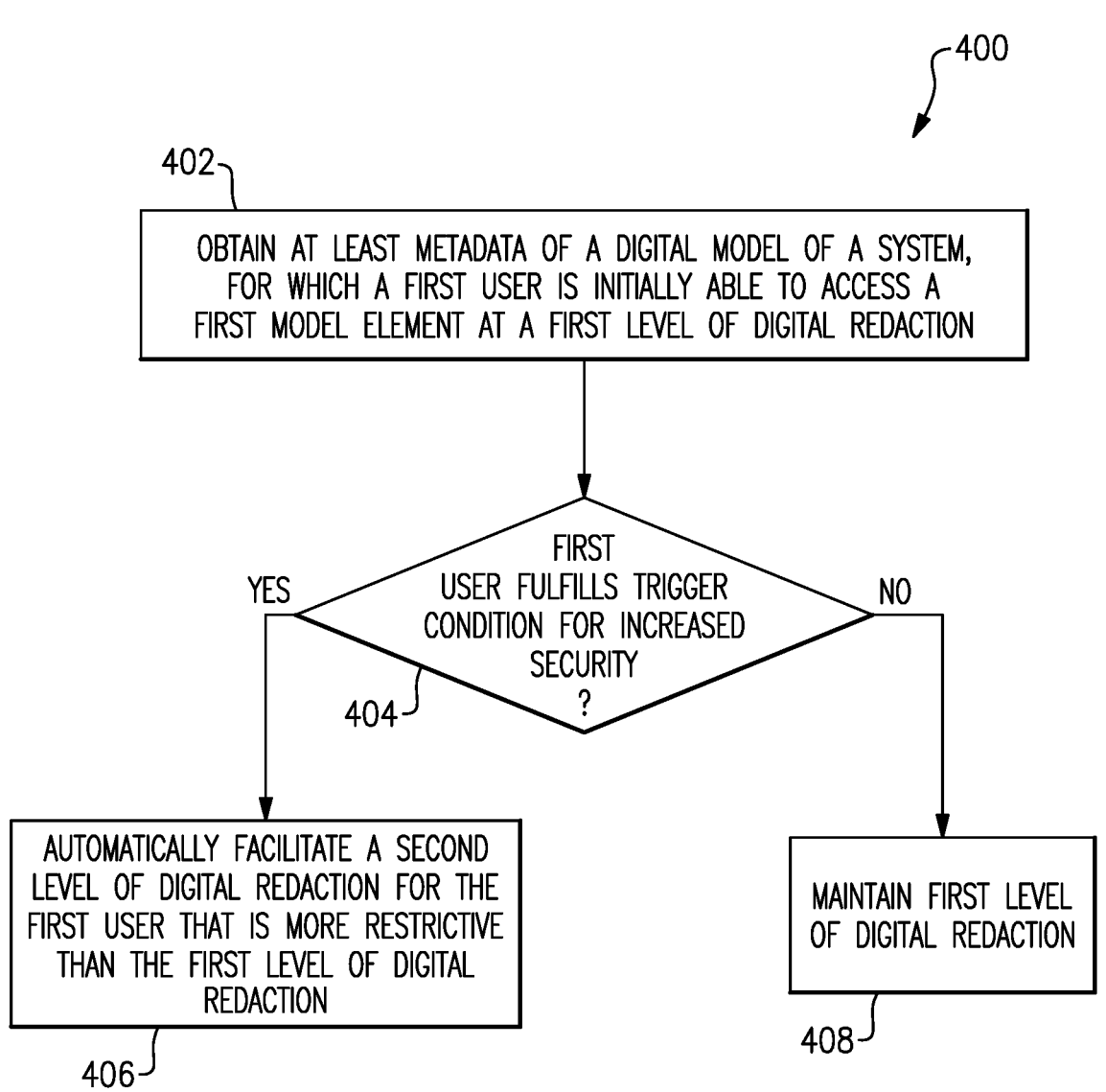
FIG. 9 illustrates another example method of automatically facilitating redaction of a digital model.

FIG. 9 illustrates another example method 400 of automatically facilitating redaction of a digital model that may be performed by the security server 22, for example. At least metadata of a first digital model 60 of a first system (e.g., a first drone system) is obtained for which a first use is initially able to access a first model element at a first level of digital redaction (step 402).

A determination is made of whether the first user fulfills a trigger condition for increased security (step 404). If the first user fulfills the trigger condition (a "yes" to step 404), then a second level of digital redaction that is more restrictive than the first level of redaction is automatically facilitated for the first model element for the first user (step 406). Otherwise, if the trigger condition is not satisfied (a "no" to step 404), then the first level of digital redaction is maintained for the first model element for the first user (step 408).

The "facilitating" of step 406 may include the security server 22 implementing the second level of digital redaction or transmitting a recommendation to an administrator of the engineering team assigned with the digital model at issue to implement the second level of digital redaction, for example.

In one example, the first level of redaction includes no redaction. In another example, the first level of redaction is an at least partial redaction, and the second level of redaction is a more extensive redaction (e.g., redacting more of a model element or redacting a greater number of model elements).

The trigger condition of step 404 may be based on the first user's use or lack of use of the model element 66. In one example, the trigger condition of step 404 relates to inactivity, and includes the first user not accessing the first model element for an amount of time that exceeds a predefined inactivity monitoring period. The security server 22 may interpret such inactivity as an indication that the first user does not need access to the first model element, and on that basis implement a the second level of digital redaction for the first model element.

In one example, the trigger condition of step 404 relates to excessive use, and includes the first user accessing the first model element a quantity of times that exceeds a predefined overuse quantity threshold and/or the first user accessing the first model element for a duration of time that exceeds a predefined overuse time threshold. Such behavior may be indicative of the first user trying to illicitly copy the model element (e.g., by taking video or screenshots).

The trigger condition of step 404 may be based on the user's role within the system 20, and in one particular example the trigger condition includes the first user having left a first engineering team of the plurality of engineering teams (where they were subjected to the first level of redaction of the first model element), and joined a different, second engineering team in the system 20, or the user changing roles at the first engineering team (e.g., going from being a manager to a subordinate to the manager). In this case, to avoid accidentally letting the user maintain the first level of digital redaction, the method 400 implements the second level of digital redaction.

As discussed above, the methods 300 and 400 can be used to automatically implement digital redactions based on historical redactions and/or the particulars of a given user (e.g., their use, lack of use, or changed team in the system 20) and/or the particulars of a pair of digital models (e.g., based on file similarity, subsystem similarity, etc.).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of automatically facilitating redaction of a digital model, comprising:

obtaining at least metadata of a first digital model of a first system and a second digital model of a second system, wherein the first digital model and the second digital model each include a plurality of respective discrete subsystems representing different functions of respective systems of the first digital model and the second digital model, each subsystem including a plurality of respective discrete model elements, and design responsibility for the plurality of respective discrete subsystems is assigned to a plurality of different engineering teams; and based on said at least metadata of the first digital model indicating the first digital model includes a first digital redaction, and further based on the first digital model and the second digital model meeting at least one similarity criterion, automatically facilitating a second digital redaction in the second digital model based on the first digital redaction;

wherein said automatically facilitating comprises implementing the second digital redaction in the second digital model;

wherein said obtaining at least metadata of a first digital model of a first system and a second digital model of a second system and said automatically facilitating a second digital redaction in the second digital model are performed by processing circuitry; and wherein:

the at least one similarity criterion includes the first digital model and the second digital model sharing a file, the first digital redaction redacts a particular portion of the file in the first digital model, and the second digital redaction is a redaction of the particular portion of the file in the second digital model; or the at least one similarity criterion includes the first digital model and the second digital model each having a respective subsystem that share a plurality of files, the first digital redaction redacts a particular portion of the plurality of files in the first digital model, and the second digital redaction redacts the particular portion of the plurality of files in the second digital model.

2. The method of claim 1, wherein:

the at least one similarity criterion includes the first digital model and the second digital model sharing the file;

the first digital redaction redacts the particular portion of the file in the first digital model; and the second digital redaction is the redaction of the particular portion of the file in the second digital model.

3. The method of claim 1, wherein:

the at least one similarity criterion includes the first digital model and the second digital model each having a respective subsystem that share the plurality of files;

the first digital redaction redacts the particular portion of the plurality of files in the first digital model; and the second digital redaction redacts the particular portion of the plurality of files in the second digital model.

4. The method of claim 1, comprising utilizing a neural network to determine whether the first digital model and the second digital model meet the at least one similarity criterion.

5. The method of claim 1, wherein:

the first digital redaction redacts a first model element of the first digital model;

design responsibility for the first model element is assigned to a first engineering team of the plurality of different engineering teams;

the second digital redaction is a redaction applied to a second model element for which design responsibility is assigned to a second engineering team of the plurality of different engineering teams; and said automatically facilitating the second digital redaction in the second digital model is further based on a history of digital redactions that the first engineering team has applied for the second engineering team outside of the first digital model and the second digital model.

6. The method of claim 1, wherein:

a first user of one of the plurality of different engineering teams is initially able to access a first model element, which is of the first digital model or the second digital model, at a first level of digital redaction; and the method includes:

determining that the first user has not accessed the first model element for an amount of time that exceeds a predefined inactivity period; and based on the determining, automatically facilitating a second level of digital redaction that is more restrictive than the first level of digital redaction for the first model element for the first user.

7. The method of claim 1, wherein:

a first user of one of the plurality of different engineering teams is initially able to access a first model element, which is of the first digital model or the second digital model, at a first level of digital redaction; and the method includes:

determining that the first user has accessed the first model element a quantity of times that exceeds a predefined overuse quantity threshold or that the first user has accessed the first model element for a duration of time that exceeds a predefined overuse time threshold; and based on the determining, facilitating a second level of digital redaction that is more restrictive than the first level of digital redaction for the first model element for the first user.

8. The method of claim 1, a first user of a first engineering team of the plurality of different engineering teams is initially able to access a first model element, which is of the first digital model or the second digital model, at a first level of digital redaction; and the method includes:

determining that the first user has left the first engineering team and joined a second engineering team of the plurality of different engineering teams; and based on the determining, facilitating a second level of digital redaction that is more restrictive than the first level of digital redaction for the first model element for the first user.

9. The method of claim 1, wherein the first system and the second system are both aircraft.

10. The method of claim 1, wherein the first system and the second system are both drones.

11. A system for redacting a digital model, comprising:

a security server comprising processing circuitry operatively connected to memory, the processing circuitry configured to:

obtain at least metadata of a first digital model of a first system and a second digital model of a second system, wherein the first digital model and the second digital model each include a plurality of respective discrete subsystems representing different functions of respective systems of the first digital model and the second digital model, each subsystem including a plurality of respective discrete model elements, and design responsibility for the plurality of respective discrete subsystems is assigned to a plurality of different engineering teams; and based on said at least metadata of the first digital model indicating the first digital model includes a first digital redaction, and further based on the first digital model and the second digital model meeting at least one similarity criterion, automatically facilitate a second digital redaction in the second digital model based on the first digital redaction;

wherein to automatically facilitate the second digital redaction, the processing circuitry is configured to implement the second digital redaction in the second digital model; and wherein:

the at least one similarity criterion includes the first digital model and the second digital model sharing a file, the first digital redaction redacts a particular portion of the file in the first digital model, and the second digital redaction is a redaction of the particular portion of the file in the second digital model; or the at least one similarity criterion includes the first digital model and the second digital model each having a respective subsystem that share a plurality of files, the first digital redaction redacts a particular portion of the plurality of files in the first digital model, and the second digital redaction redacts the particular portion of the plurality of files in the second digital model.

12. The system of claim 11, wherein:

the at least one similarity criterion includes the first digital model and the second digital model sharing the file;

the first digital redaction redacts the particular portion of the file in the first digital model; and the second digital redaction is the redaction of the particular portion of the file in the second digital model.

13. The system of claim 11, wherein the at least one similarity criterion includes the first digital model and the second model digital sharing the plurality of files.

14. The system of claim 11, wherein the processing circuitry is configured to utilize a neural network to determine whether the first digital model and the second digital model meet the at least one similarity criterion.

15. The system of claim 11, wherein:

the first digital redaction redacts a first model element of the first digital model;

design responsibility for the first model element is assigned to a first engineering team of the plurality of different engineering teams;

the second digital redaction is a redaction of a second model element for which design responsibility is assigned to a second engineering team of the plurality of different engineering teams; and the processing circuitry is configured to further base the automatically facilitate the second digital redaction on a history of digital redactions that the first engineering team has applied for the second engineering team outside of the first digital model and the second digital model.

16. The system of claim 11, wherein:

the at least one similarity criterion includes the first digital model and the second digital model each having a respective subsystem that share the plurality of files;

the first digital redaction redacts the particular portion of the plurality of files in the first digital model; and the second digital redaction redacts the particular portion of the plurality of files in the second digital model.

17. The system of claim 11, wherein the first system and the second system are both aircraft.

18. The system of claim 11, wherein the first system and the second system are both drones.

* * * * *